(12) United States Patent
Dannenberg

(10) Patent No.: US 6,263,269 B1
(45) Date of Patent: Jul. 17, 2001

(54) CONFIGURATION PROGRAMMING OF INPUT/OUTPUT CONNECTIONS FOR NETWORK MODULES IN A MULTIPLEXED VEHICLE COMMUNICATION SYSTEM

(75) Inventor: Robert D. Dannenberg, Auburn, IN (US)

(73) Assignee: International Truck and Engine Corporation, Chicago, IL (US)

(\*) Notice: Subject to any disclaimer, the term of this patent is extended or adjusted under 35 U.S.C. 154(b) by 0 days.

(21) Appl. No.: 09/447,132

(22) Filed: Nov. 22, 1999

Related U.S. Application Data
(60) Provisional application No. 60/113,443, filed on Dec. 23, 1998.

(51) Int. Cl.[7] ............................................. G06F 7/70
(52) U.S. Cl. ......................... 701/29; 701/1; 701/36; 710/100
(58) Field of Search ................... 701/1, 36, 29; 340/825.03, 825.57; 710/100, 131, 132

(56) References Cited

U.S. PATENT DOCUMENTS

| | | |
|---|---|---|
| 4,809,177 | 2/1989 | Windle et al. . |
| 5,365,436 | 11/1994 | Schaller et al. . |
| 5,475,818 | 12/1995 | Molyneaux et al. . |
| 5,510,775 | 4/1996 | Loncle . |
| 5,742,920 * | 4/1998 | Cannuscio et al. ............... 701/1 |
| 5,794,165 * | 8/1998 | Minowa et al. ............... 701/1 |
| 6,122,572 * | 9/2000 | Yavnai ............... 701/36 |
| 6,154,701 * | 11/2000 | Löffler et al. ............... 701/1 |

FOREIGN PATENT DOCUMENTS

| | | |
|---|---|---|
| 4039005 A | 6/1991 | (DE) . |
| 19709319 A1 | 9/1998 | (DE) . |
| 2130165 * | 6/1984 | (GB) ............... 701/1 |

OTHER PUBLICATIONS

Von Hans Werner Ballas, Manfred Brossette & Udo Heiss, Das Neue Elektrik/Elektronik–Konzept des Stadtlinienomnibusses Citaro von Daimler–Benz, ATZ Automobiltechnische Zeitschatt 100, 1998.

\* cited by examiner

Primary Examiner—Richard M. Camby
(74) Attorney, Agent, or Firm—Jeffrey P. Calfa; Dennis Kelly Sulivan; Gilberto Hernandez

(57) ABSTRACT

A control system for a vehicle provides for the control of electrically differentiated loads utilizing a local controller, the functionality of which depends upon a programmed central control unit. A first serial data link connects a plurality of autonomous local controllers of fixed functionality to the central control unit. A second serial data link links at least a first dependent controller to electrical system controller. The electrical system controller provides for controlling multiplexing of signals on the first and second serial data links. Memory provides both protected and nonprotected sections, with the protected sections providing storage for configuration data structures residing in memory and the data structures providing functional definitions for the first dependent controller. A core program resides in memory for use with the data structures, and a central processor executes the core program using the data structures for generating control signals for transmission to the dependent controllers. The first dependent controller are responsive to the control signals for assuming specialized control states.

10 Claims, 4 Drawing Sheets

CONFIGURATION PROGRAMMING OF INPUT/OUTPUT CONNECTIONS FOR NETWORK MODULES IN A MULTIPLEXED VEHICLE COMMUNICATION SYSTEM

REFERENCE TO PRIOR APPLICATION

The present application is a continuation in part of Provisional Application No. 60/113,443 for Programming Input/Output Connections of Networked Interfaced Modules filed Dec. 23, 1998.

INCORPORATION BY REFERENCE OF RELATED APPLICATION

The present application is related to utility application Ser. No. 60/113,443 for Remote Interface Modules with Programmable Functions filed Dec. 23, 1998 and hereby expressly incorporates that application by reference.

BACKGROUND OF THE INVENTION

1. Field of the Invention

The present invention relates to multiplexing communication networks on vehicles and more particularly relates to providing a network having a central control module and one or more remote generic modules to provide control of non-standard vehicle vocations as well as specialized controllers for conventional vehicle vocations.

2. Description of the Prior Art

At a simple level, communication between two agents may be kept physically separated from communications occurring among other agents. Where two or more signals do not use the same physical space, there is no need to separate the signals in time or in carrier wave frequency. Such a communications regime is sometimes termed physical division multiplexing although the term multiplexing is usually reserved to techniques for applying multiple signals to a single medium or physical space. So called physical division multiplexing describes how motor vehicles have been traditionally wired. The use of separate dedicated wires to connect each switch and lamp is a type of physical division multiplexing. Obviously, physical division multiplexing, while simple in concept, results in the use of many wires (the classical motor vehicle electrical harness), which are difficult to install during manufacturing and problematic to maintain in the field.

Arrangements allowing a number of agents to communicate over a common physical layer or medium offer much greater physical simplicity. Intelligible communication between two or more devices among a greater plurality of devices, all over a common medium, depends upon the communicating devices being able to distinguish, and understand, messages directed to them from other messages which they receive, but which are not intended for them. The process of distinguishing messages depends upon the transmitter of the message applying some attribute to the message which identifies it to the intended recipient. In human conversation, most people readily distinguish speech directed to them from interfering crosstalk in a crowd by the distinctive aspects of the voice of the person addressing them. Where the members of the group are electrical components, the problem still involves identification of a distinguishing attribute of the signal. Appropriate attributes for signals take a number of forms.

A line communicating a signal from a remote switch to a lamp to turn on or off (by having a second switch, local to the lamp, change states to control connection of the lamp between a power bus and ground) cycles only rarely. In a typical trip such a change in state occurs only once or twice, if at all. Where such a line is not intended to provide power to the lamp, and simply indicates changes in state for the local switch controlling the lamp, the line will have the capacity to handle far more data than the occasional indications to turn a lamp on and off. The objective of maintaining simplicity in manufacturing and maintenance are preferably met by allowing communication among a number of components to occur in a single medium, or at least as few communication lines as possible. The line used to connect switch and lamp could interconnect a number of components, carrying messages between any grouping of elements connected to the line when not required to carry an instruction to a lamp to turn on. One way of achieving this objective is a communications regime which divides time into slots during which particular combinations of components have use of a signaling line. Such methods are well known in the art and are examples of time division multiplexing (TDM). In motor vehicles, time division and related multiplexing techniques offer substantial simplification in physical layer required to support the control of vehicle vocations.

Rigid time division multiplexed communications appear to interleave data signals into a single serial signal over a single physical medium. Multiplexed communication systems also provide the reverse function (demultiplexing) of dividing the single signal into multiple, nonsynchronous digital signals. Where demands on the capacity of the data transmission medium are not especially heavy, any unit may be allowed to claim the medium provided collision detection is provided for and other indicia, such as address headers, indicate the signal's destination.

As applied to motor vehicles, multiplexed communications over serial data paths are an effective technique for reducing the number of dedicated communication paths between the numerous switches, sensors, devices and gauges installed on the vehicles. With each increase in the number and variety of accessories and functions installed on each vehicle, the benefits of using a single, multiplexed communication serial link for passing instructions to and receiving information from vehicle devices as diverse as running lights and rear axle temperature sensors becomes greater. Multiplexing the signals to and from local controllers and switches for vehicle systems promises greater physical simplicity through displacing much of the vehicle wiring harness, reducing manufacturing costs, facilitating vehicle electrical load management, and enhancing system reliability.

The specific manner of implementing multiplexed communications is outside the scope of the present invention, which applies a defined protocol, the SAE J1939 protocol. The development by the Society of Automotive Engineers of the J1939 series of standards for multiplexed communications testifies to the progress in the application of multiplexed communications to vehicles. Standards have been or are being developed relating the communication path, transmission collision detection, diagnostic ports and data protocols, among other topics. The J1939 protocol provides an open protocol and definition of the performance requirements of the medium of the physical layer, but also allows for development of proprietary protocols. The SAE J1939 protocol is a specialized application of a manufacturing costs, and anticipated improvements in reliability. Notwithstanding this recognition, the teaching of the Windle patent falls short of teaching a generalized physical layer in which numerous specialized functions are implemented by programming. Windle et al. did not attempt to extend the idea of single design controller outside of an environment where the requirements on the controller could be fully anticipated nor did they attempt to remove specialized programming from the distributed controllers.

Numerous advantages would flow from enabling a manufacturer to provide a chassis with a generalized electrical control layer on which programming could add extensive functionality. For example, builders of luxury coaches, fire trucks and ambulances, all place highly specialized requirements on a vehicle's electrical system which may, or may not, be known to the chassis manufacturer. In some cases these requirements may even be unique to a particular vehicle. For example, a coach builder may wish to install a highly customized, zone activated air refrigeration system on a vehicle. Such specialized systems or vehicle vocations have required complex, customized wiring systems to support. Were a coach builder able to adapt a serial communication system to the functionality requirements of the various bodies, and further able to specify accessory functionality without the need to hardwire that functionality into the vehicle, substantial gains in physical simplicity and reliability could be achieved.

Substantial economies of scale could be gained from using a standardized component for several vocations on commercial vehicles. The ability to support such a device would also simplify assembly and allow for smaller parts inventories, as partially achieved by Windle et al. Such a generic control regime would allow greater differentiation in vehicles to be economically obtainable.

Windle et al. contemplated the use of fully reprogramable local controllers, which were adaptable to a defined sets of tasks by reprogramming. More recently, suppliers of major power train components have included a dedicated controller suitable for managing the component and for communicating with a vehicle electrical system controller using the open protocol of the J1939 standard. These suppliers allow a limited type of configuration programming of the controllers for changing the values of certain vehicle operating parameters. Configuration data has been used to change values of certain controlled parameters, such as engine horsepower/torque output curves, fuel rates and cruise control performance; however, the functional definition of the input and output interfaces of controllers have not been changed and the configuration programming continues to reside in the local controller.

SUMMARY OF THE INVENTION

An object of the invention is to provide a vehicle communications and control system supporting uniform physical layers across groups of vehicles of increasingly differentiated vocational requirements.

Another object of the invention is to minimize the number and variety of local controllers required in the physical layer to implement vehicle vocations.

It is a still further object of the invention to provide a physical layer for a communications and control system scalable through the use of scalable, functionally generic, local controllers, substantially relieving the communications and control system of input and output resource limitations.

According to the invention there is provided a vehicle having a plurality of electrical loads, differentiated from one another in terms of required voltage, current drawn, load duration and variability of energization levels. The vehicle conventionally includes a plurality of drive train components, such as engines, transmissions and anti-lock brake systems to which electronic control is applied. Each major drive train component has its own autonomous controller, which executes a local program, but which responsive to requests received by the controller from a control network. Each autonomous controller includes means for receiving requests relating to a drive train component, and means for monitoring drive train component status in order to provide status indications for the component over the network including a first serial data bus to an electrical system controller.

The invention further includes at least one dependent controller for accessory components. The dependent controller includes a plurality of ports available for functional definition. The dependent controller includes a processor subject to remote control to specify all functions of the dependent controller. A second serial data bus connects the dependent controller and the electrical system controller.

The electrical system controller includes memory for storing a core program, definition data for the dependent controller and status indications received from both autonomous and dependent controllers. The core program and definition data are preferably stored in nonvolatile memory, but subject to being rewritten if required. The electrical system controller is based on a central processor connected by a bus to the memory for accessing and executing the core program on the definition data and on the status indications. Specific inputs to the dependent controllers are generated both to generate functional definition instructions for the dependent controllers and specific actions to take. The electrical system controller further includes serial bus controllers providing for multiplexing of functional definition instructions on the second serial data bus.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
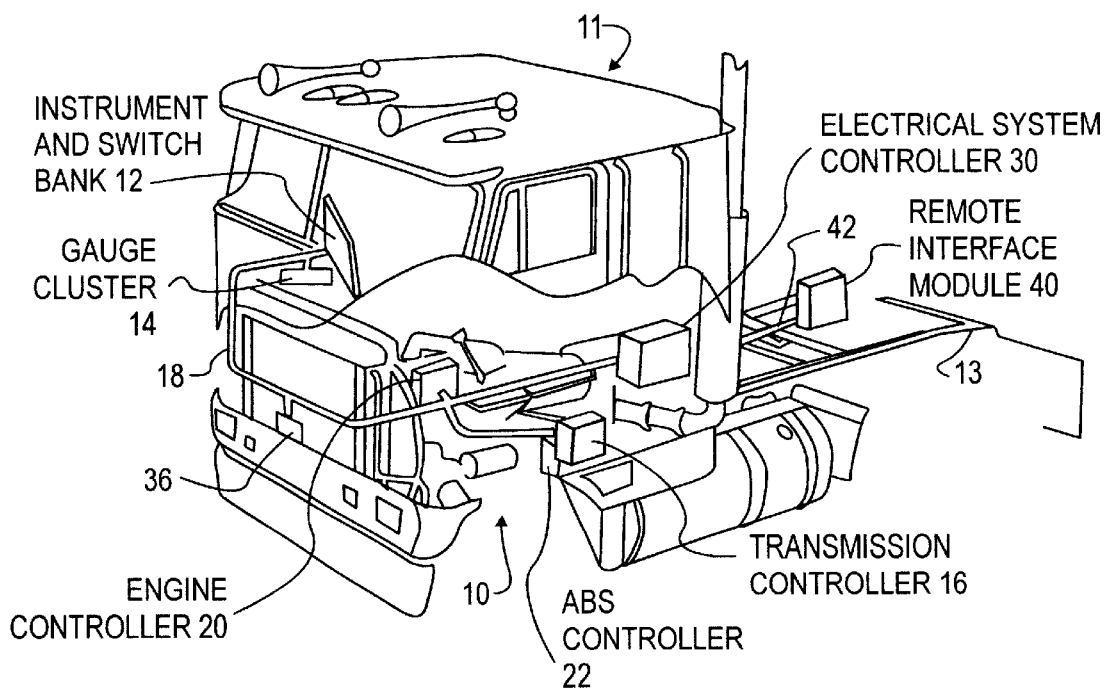
FIG. 1 is a perspective view of a vehicle electrical system.

FIG. 1 is a perspective view of a vehicle electrical system 10 installed on a vehicle 13. Vehicle control system 10 comprises an electrical system controller (ESC) 30, which is the primary component of a vehicle electronic control system. ESC 30 manages a number of vocational controllers disposed on vehicle 13 and executes a load management program which oversees the total load imposed on the vehicle electrical system and power train by various accessories installed on the vehicle. Most active vehicle components are directly controlled by one of a group of autonomous, vocational controllers, which include a gauge cluster 14, an engine controller 20, a transmission controller 16, an auxiliary instrument and switch bank 12, and an antilock brake system (ABS) controller 22, all of which are connected to ESC 30 over a serial data bus 18. The autonomous controllers include local data processing and programming and are typically supplied by the manufacturer of the controlled equipment. Serial data link 18 is a twisted pair cable constructed in accordance with SAE standard J1939 and is externally accessible via a diagnostic port 36. Although the autonomous controllers handle many functions locally and are functionally defined without reference to ESC 30, they report data to ESC 30 and can receive operational requests from ESC 30.

A second serial data link 42 extends from ESC 30 back to a remote interface module 40. Remote interface module 40, similarly to the autonomous controllers, provides local control signals to electrical devices constituting or controlling loads installed on vehicle 13. While remote interface module 40 has data processing capability, it typically includes minimal local programming and is dependent on and functionally specified by signals received over the second serial data link 42 from ESC 30 for operation. Hence RIMs 40 are herein termed dependent controllers.

The loads imposed on vehicle 13 systems controlled by electrical control system 30 are usually electrical loads, however, they may include electronically controlled engagement of mechanical devices to the power train of vehicle 13. Gear selection in an automatic transmission would be an example of such an arrangement. Other electrically controlled nonelectrical loads can include control of a clutch for an air conditioning compressor, or actuation of pumps driven by the vehicle drive train. The load management program can, depending on power demands by components, including accessories controlled by a RIM 40, request increased power output from the engine through engine controller 20.

Gauge cluster 14, transmission controller 16 and engine controller 20 all communicate with electronic system controller 30, which also monitors inputs received from the auxiliary instrument and switch bank 12, over the serial communication link in harness 18. Electronic system controller 30 may be programmed to override the normal response characteristics of the gauge cluster 14, transmission controller 16 and engine controller 20, should electrical and mechanical loads exceed the capacity of the vehicle, should requests conflict with one another, and under other circumstances.

A RIM 40 is a general purpose control interface allowing the attachment of various accessories to vehicle 13. RIM 40 provides a plurality of ports providing for each of the following: analog inputs; analog outputs; digital inputs; and digital outputs. Characterization of a particular port as, for example, an output port, does not necessarily mean that it functions exclusively as an output port. For example, an output port may include voltage drop sensing elements, current flow sensing elements, or both, allowing determination by ESC 30 of whether, for example, a bulb in a lamp connected to the output port is operative, or whether a short circuit condition exists in an attached device.

Figure 2:
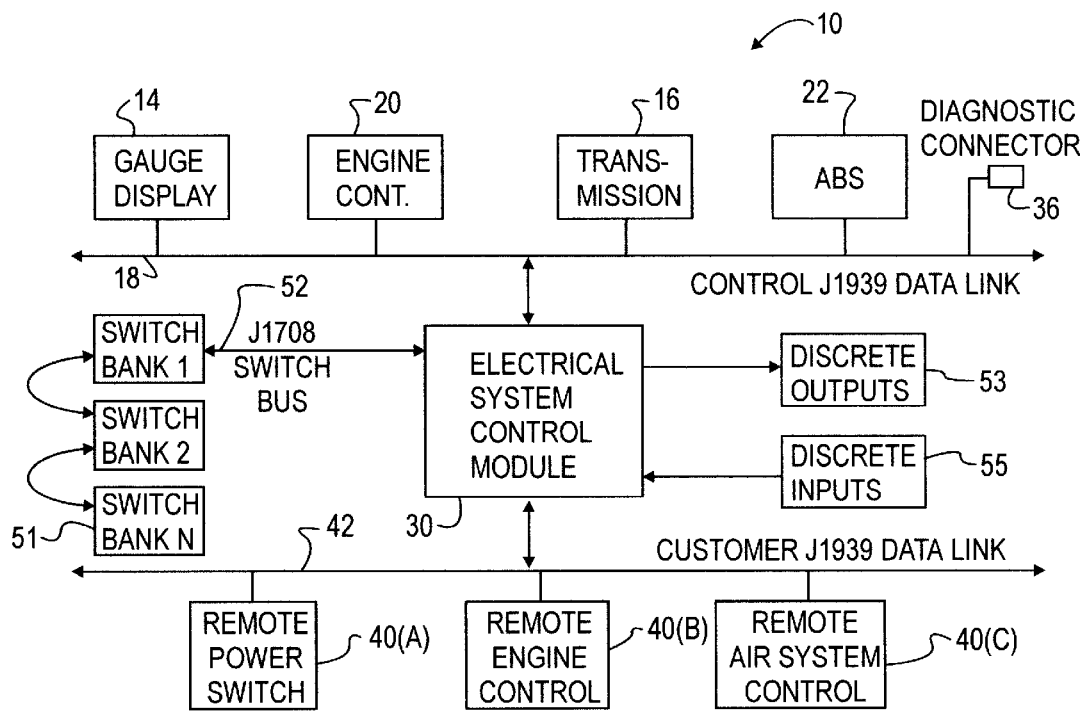
FIG. 2 is a high level block diagram of the control network for a vehicle.

FIG. 2 is a schematic illustration of the vehicle control system 10. Electrical system controller 30 communicates with local vocational controllers over one of two major SAE J1939 serial data links 18 and 42. The J1939 standard provides for both a open protocol and a proprietary protocol, which differ in the formatting of information transmitted over the serial data links. Accordingly, serial data links 18 and 42 may use the same or different communication protocols. Controllers for substantially common vehicle components such as transmissions, engines and the like communicate with ESC 30 over serial data link 18, which utilizes a open protocol. A diagnostic connector 36 taps into serial data link 18 over which portions of the programming of ESC 30 may be overwritten. In the illustrated embodiment three remote interface modules are defined by ESC 30 over serial data link 42 to function as a remote power switch 40(A), a remote engine controller 40(B) and a remote air control system 40(C). The specific functions of the several remote interface modules are unimportant and are given as examples only. Disposition of the control of major vehicle drive train components, the vehicle gauge cluster and the diagnostic port 36 onto serial data link 18, and the provision of a second serial data link 42 for carrying communication among the definable, dependent controllers (remote interface modules 40) segregates major vehicle elements in a protected partition via link 18 which is isolated from operator defined functionality implemented over serial data link 42.

ESC 30 also provided from monitoring several bi-state switches in a group of switch banks 51 over a relatively low baud rate SAE J1708 data link 52. ESC 30 can also be directly connected to several devices and sensors directly, which are grouped as discrete outputs 53 and discrete inputs 55.

Figure 3:
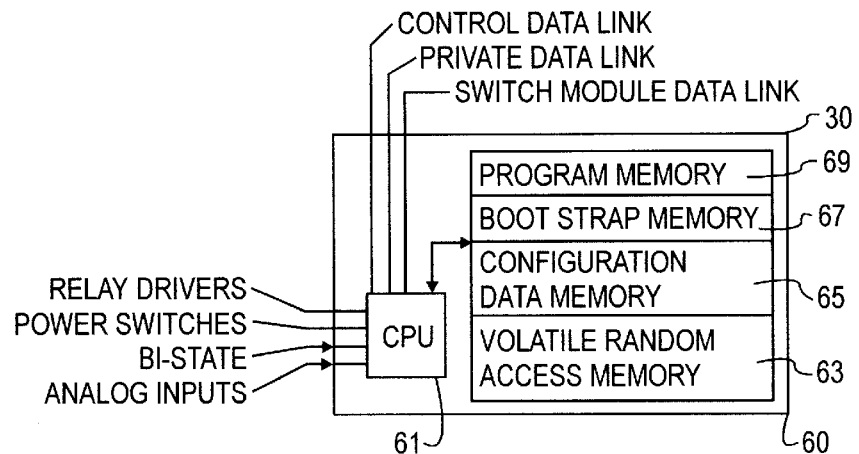
FIG. 3 is a diagrammatic depiction of the disposition of data interfaces for the central electrical system controller of the invention.

FIG. 3 is a block diagram of the various elements of ESC 30. ESC 30 includes a fixed number of interface connections for reading bi-state (i.e. on/off) switches. These inputs are appropriate for reading warning light sensors that typically provide a vehicle ground connection to indicate that the sensor is in an active state. An open circuit connection is provided by the sensor to indicate an inactive state. Another collection of inputs labeled analog inputs. These inputs are subject to sampling, analog to digital conversion and storage as a representative binary value in volatile random access memory section 63 of memory 60 for further processing.

A plurality of discrete output interfaces may include low power relay driver-connections that are capable of activating an electro-mechanical relay device located elsewhere on the vehicle and into the vehicle power distribution system (not shown). ESC 30 also provides high power solid state output channels. The high power output channels or power switches can handle up to a maximum of ten to twenty amperes at a battery voltage level of 14 volts. The direct input and output channels may be functionally defined by configuration programming of ESC 30. If the number of channel interfaces is insufficient, one or more RIMs 40 are added to private serial data link 42.

ESC 30 has three serial data interfaces including those to the two J1939 serial data links 18 and 42. The J1939 serial data links operate at 250K baud data rates and, as described above, provide data communication between and among the major power train component autonomous controllers and ESC 30 on link 18 and between the dependent controllers and ESC 30 on link 42. The Siemen C167 Integrated Circuit provides two J1939 ports which are independently accessible and of which one is connected to the private J1939 link 42. The public J1939 link 18 provides connection to the autonomous contender. In this way the definable RIMs 40 are segregated from the autonomous controllers, protecting the autonomous controllers from programming errors or faults occurring with respect to RIMs 40.

Program memory 69 and most of the addresses of configuration data memory 65 are preferably constructed of flash memory allowing reprogramming of ESC 30 from diagnostic port 36 if required. Program memory 69 preferably requires high input voltages for rewriting, or is otherwise relatively protected compared to configuration data memory 65. ESC 30 also functions as a data gateway between serial data link 18 and serial data link 42. Serial data link 52 is a 9600 baud link in accordance with the SAE 1708 protocol. Volatile random access memory 63 provides a scratch pad for data from dependent controllers and sensor inputs. Boot-strap memory 67 loads the core operating program and configuration data. A central processing unit can address system memory for execution of the core program and utilization of the configuration data. The program stored in program memory 69 is not typically changed to accommodate the functional definition of either the ports of ESC 30 or RIMs 40. The program is an event interruptable, looping algorithm which relies entirely on data tables stored in the configuration data memory section 65 to implement specific functionality on any physically undefined interface or port of ESC 30 or a RIM 40. The data tables can be unique to a given vehicle, and relate port addresses to particular functionality and provide for vehicle response under defied conditions.

A RIM 40 may be constructed using digital signal processors or equivalent circuit elements. The methods of programming a digital signal processor to implement any number of circuit elements is well known in the art. ESC 30 must reliably implement various functions at particular ports of the RIM 40 and accordingly a standardized, expandable addressing scheme for each dependent controller and its respective I/O interfaces are provided.

Figure 4:
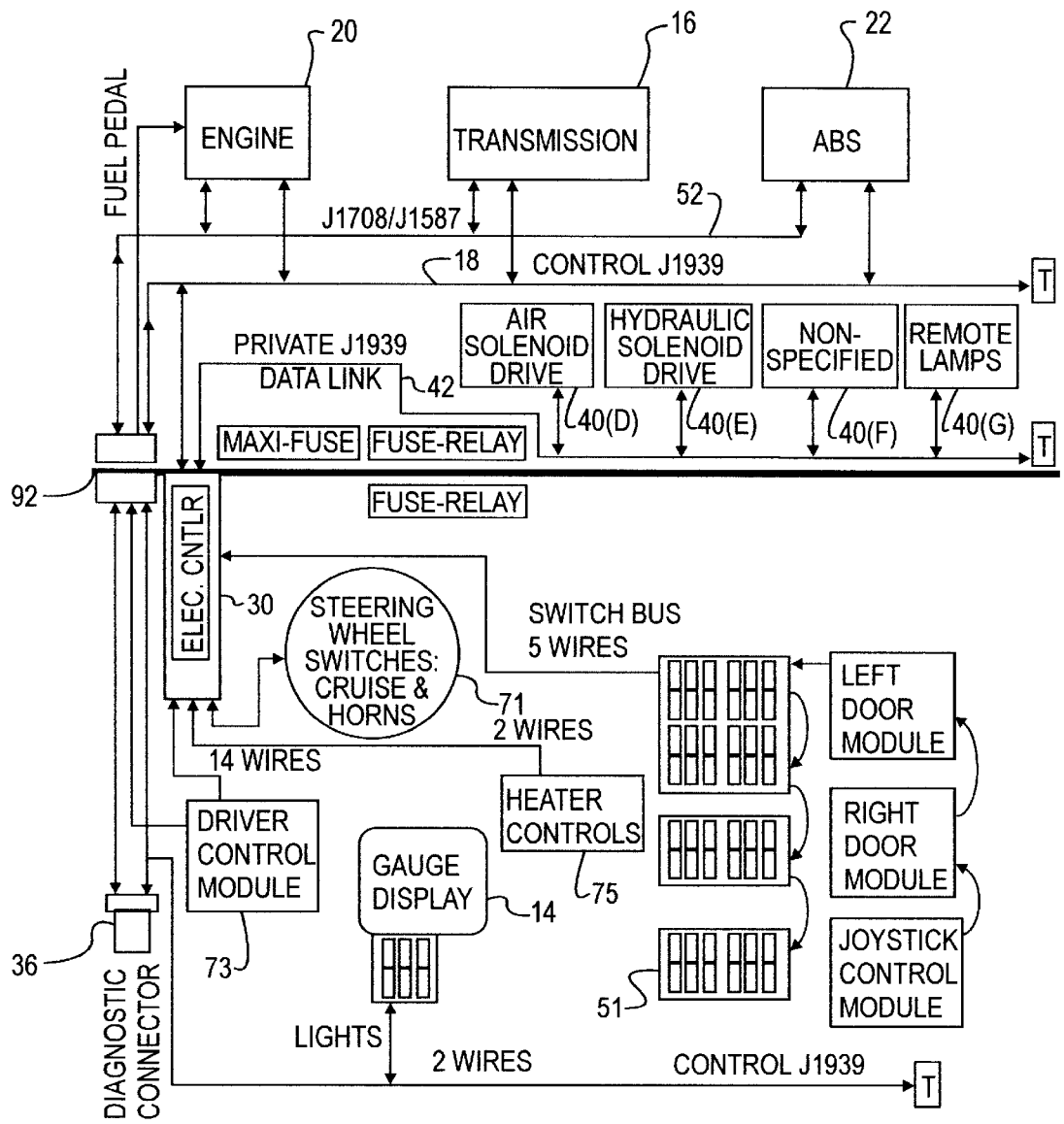
FIG. 4 is a detailed block diagram of the control network of the present invention.

FIG. 4 is a detailed schematic illustration of a physical layer for the invention. ESC 30, located on the cabin side of firewall 92, communicates with engine controller 20, transmission controller 16 and anti-lock brake system 22, and gauge display 14, primarily over serial data link 18. Selected bi-state switches in engine controller 20, transmission controller 16 and ABS 22 may be controlled or monitored over serial data link 52. Serial data link 42 provides communication between four dependent controllers or remote interface modules, on which ESC 30 implements an air solenoid drive 40(D), a hydraulic solenoid drive 40(E), a non-specified controller 40(F) and a controller for remote lamps 40(G). ESC 30 is directly connected to heater controls 75, steering wheel switches 71, and a driver control module 73 handling a plurality of other switches. The direct interfaces implemented by ESC 30 are also functionally defined by configuration programming.

Figure 5:
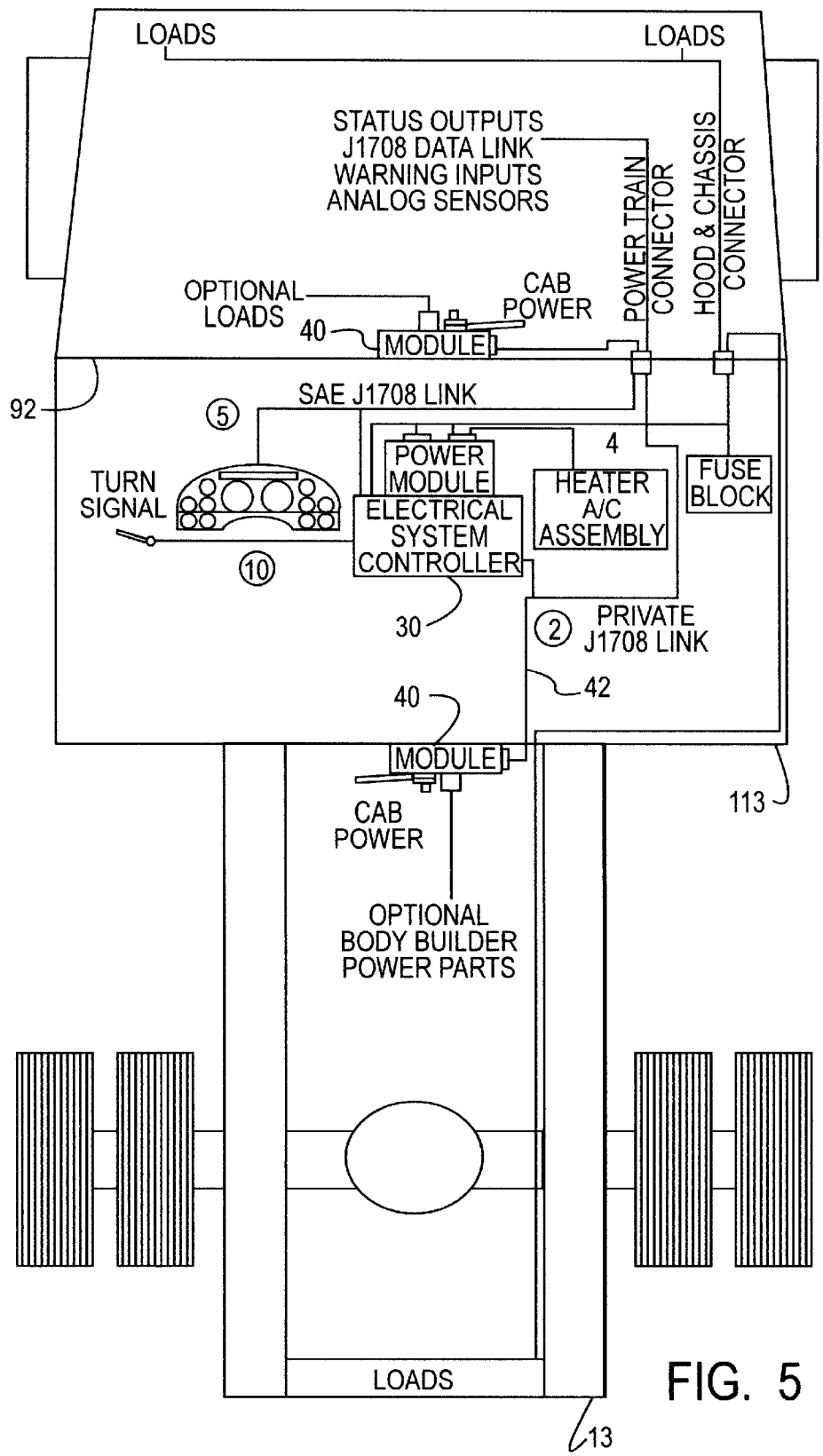
FIG. 5 is a schematic illustration of disposition of the control network of the present invention on a truck.

FIG. 5 illustrates a possible physical layer for a vehicle control system including an ESC 30, a plurality of RIMs 40, and a plurality of autonomous controllers on a truck 13. One RIM 40 is located at the exterior of cab 113, providing a plurality of interfaces in the rear portion of truck 13. A coach or vehicle body builder can define the interfaces to control a variety of optional or accessory equipment. The coach or vehicle body builder uses programming specifications to design a configuration data base to give the dependent controller functionality. A second RIM 40 may be positioned forward of the fire wall 92 on vehicle 13. So positioned the second RIM 40 is conveniently situated to equipment added to the front end of a vehicle such as special lights or a positionable plow.

The invention enables implementation of a vehicle communications and control system having a uniform, but scalable, physical layer. Autonomous controllers, dependent controllers, central electrical system controllers and interconnecting data links can be physically identical from one vehicle to another across groups of vehicles of increasingly differentiated vocational requirements. The only physical difference, in many cases, will be the actual physical position on the vehicle which, from an electronic standpoint, provides a substantially uniform physical layer from vehicle to vehicle. Uniformity and scalability of the dependent controllers helps minimize the number and variety of local controllers required in the physical layer to implement vehicle vocations. The scalable implementation through the use of scalable, functionally generic, local controllers, and definable interfaces on the electrical system controller substantially relieves the communications and control system of input and output resource limitations. Scalability is further enhanced by providing a core program executable on scalable data tables which define the functionality of I/O ports.

While the invention is shown in only one of its forms, it is not thus limited but is susceptible to various changes and modifications without departing from the spirit and scope of the invention.

What is claimed is:

1. A control system for a vehicle having a plurality of differentiated electrical loads, the control system comprising:

a first serial data link;

a plurality of autonomous local controllers connected to the first serial data link having fixed functionality;

a second serial data link;

at least a first dependent controller connected to the second data link and having a plurality of standard ports allowing connections to selected electrical loads;

an electrical system controller coupled to the first and second serial data links, the electrical system controller including, means for controlling multiplexing of signals on the first and second serial data links, memory, and configuration data structures residing in memory, the data structures providing functional definitions for the first dependent controller and the standard ports of the first dependent controller; and a core program residing in memory for operating on the configuration data structures to generate functional statements for the first dependent controller; and the first dependent controller being responsive to the functional statements for assuming specialized control states and defining standard port functionality.

2. A control system as claimed in claim 1, the plurality of differentiated loads including a plurality of devices coupled to the first dependent controller.

3. A control system as claimed in claim 2, further comprising:

program means executing on the electrical system controller for updating a state of the first dependent controller periodically.

4. A control system as claimed in claim 3, further comprising:

the first dependent and the autonomous controllers including input interfaces for receiving sensor data and means for providing the transmission of sensor data to the electrical system controller;

means for staging the sensor data in the electrical system controller; and the core program being further operable on the configuration data for interpreting and responding to data from the first dependent controller.

5. A vehicle comprising:

a plurality of drive train components installed on the vehicle;

an autonomous controller coupled to each of the plurality of drive train components, each autonomous controller including, means for receiving requests relating to a drive train component, means responsive to requests, for issuing instructions to the drive train component, and means for monitoring drive train component status and generating status indications;

a first serial data bus connected to each autonomous controller for delivering requests to the autonomous controllers and carrying status indications from the autonomous controllers;

a plurality of subsidiary, controllable components installed on the vehicle;

a dependent controller connected to the subsidiary, controllable components, the dependent controller including a plurality of ports subject to functional definition;

a second serial data bus connected to the dependent controller; and an electrical system controller connected to the first and second serial data busses, including, memory for storing a core program and definition data for the dependent controller, processing means accessing the memory for executing the core program on the definition data and on the status indications to define functional instructions for the dependent controllers, and means for controlling multiplexing of functional instructions on the second serial data bus.

6. A vehicle as claimed in claim 5, further comprising:

an external access port to the first serial data bus to the electrical system controller; and means for overwriting the definition data in memory over the external access port.

7. A vehicle control system, comprising:

a generalized physical layer including, a serial data bus, and at least a first generic local controller having a plurality of standard ports for the connection of devices, and further being connected to receive and transmit data over the serial data bus, including data specifying functionality for the generic local controller and one or more of the plurality of standard ports;

a system controller connected to the serial data bus for data communication and having memory for the storage of data and programs;

configuration data stored in the memory specifying functionality for at least the first generic local controller and for at least one standard port of the generic local controller;

a core operating program stored in the memory operable on the configuration data for the generic local controller in the generalized physical layer to construct instructions implementing functionality on the generic local controller; and means for transmitting the instructions as data to the generic local controller.

8. A vehicle control system as set forth in claim 7, wherein the core operating program is usable with configuration data for a plurality of generic local controllers.

9. A vehicle control system as set forth in claim 8, wherein the system controller has an external interface over which the core operating program and configuration data may be written to the memory.

10. A vehicle control system as set forth in claim 9, further comprising:

a non-generalized physical layer including, a second data bus connected to the system controller, and a plurality of specialized local controllers connected to the second data bus.

* * * * *